United States Patent Office 3,291,864
Patented Dec. 13, 1966

3,291,864
POLYTETRAFLUOROETHYLENE COMPOSITION CONTAINING VINYLIDENE FLUORIDE-PERFLUOROPROPYLENE COPOLYMER
Judson B. Eldridge, 300–A Fowler, and Elmo C. Julian, 513–A Saratoga, both of China Lake, Calif.
No Drawing. Filed Nov. 21, 1961, Ser. No. 154,078
3 Claims. (Cl. 260—900)

The invention described herein may be manufactured and used by or for the Government of the United States of America for governmental purposes without the payment of royalties thereon or therefor.

The present invention relates to a process for the extrusion of polytetrafluoroethylene, and more particularly to a process by which polytetrafluoroethylene is treated so as to become extrudable at temperatures ranging from 225° F. to 150° F. or less.

Polytetrafluoroethylene, described in U.S. Patent No. 2,230,654 and commonly known as "Teflon," is generally considered a thermoplastic resin, but it does not melt and flow as do conventional thermoplastic materials. At normal temperatures it has a crystalline or fibrous structure, but it changes to an amorphous gel state at temperatures above about 621° F. In general, Teflon articles are made by baking or sintering. The cold forming is usually done by compacting powder at room temperature under pressures of 2,000 to 10,000 pounds per square inch, then baking the resulting preform or article until the entire article has reached the gel state at about 700° to 750° F. The article is then cooled.

The present invention makes it possible to extrude polytetrafluoroethylene (Teflon) at temperatures ranging from 225° to 150° F. or lower, and at pressures from 20,000 to 1,500 pounds per square inch, depending upon the ratio of barrel area to die orifice area.

An object of the present invention is to provide an improved process for extruding polytetrafluoroethylene articles, such as rods, bars and wedges, at temperatures ranging from 225° to 150° F. or less.

Another object is to provide a process which permits a rapid production of polytetrafluoroethylene products in a finished, well-consolidated form having uniform, high strength throughout.

A further object of the invention is the provision of a process for extruding, rolling, or pressing polytetrafluoroethylene which has the economic advantages or greater ease, reduced time, equipment, and labor.

Other objects and many of the attendant advantages of this invention will be readily appreciated as the same become better understood by reference to the following detailed description.

The present invention comprises the following steps: (a) dissolving 12 to 35 percent by weight of a copolymer of vinylidene fluoride and perfluoropropylene, generally known as Viton-A the composition of which consists essentially of 32.1% by weight carbon, 1.8% by weight hydrogen and 66.1% by weight fluorine, in a solvent selected from a low-boiling ketone such as acetone and methyl ethyl ketone or a low boiling ester such as ethyl acetate and methyl acetate; (b) vigorously stirring into the resulting Viton-A solution from 65 to 88 percent by weight polytetrafluoroethylene, generally known as Teflon and hereinafter so referred to, whereby a slurry of Teflon and Viton-A is formed; (c) washing the slurry or suspension for from 5 to 10 minutes with hexane, the volume of hexane being from one to four times the volume of slurry; (d) after the suspension has settled decant or siphon off the supernatant hexane; and, dry the resulting residue or powdered Viton-Teflon material under ambient conditions for from 4 to 12 hours. The Viton-treated Teflon is now ready for extrusion at temperatures ranging from 225° F. to 150° F., or less, in a standard press. The preferred solvent for Viton-A was acetone because it was readily available.

"Viton-A" is the trademark assigned by du Pont Company to the above-mentioned copolymer which is definitely described in an article entitled "Vinylidene Fluoride-Hexafluoropropylene" by Dixon, Rexford and Rugg in Industrial Engineering and Chemistry, vol. 49, pp. 1687 to 1690 (1957).

The slurry may be washed with hexane two or three times, as necessary. Other fluorocarbons which may be used successfully in place of Viton-A are Fluorel which is a similar copolymer of hexafluoropropylene and vinylidene fluoride, and Kel-F elastomer which is a copolymer of chlorotrifluoroethylene and vinylidene fluoride.

Samples of Viton-Teflon mixtures which have been successfully extruded at about 200° F. are as follows:

Example I

| Ingredient: | Percent by weight |
| --- | --- |
| Teflon | 67 |
| Viton-A | 33 |

This material was extruded at 2,500 pounds per square inch pressure into a 2.0-inch grain.

Example II

| Ingredient: | Percent by weight |
| --- | --- |
| Teflon | 75 |
| Viton-A | 25 |

This sample was extruded into a 1.0-inch rod at 1,500 pounds per square inch pressure.

Example III

| Ingredient: | Percent by weight |
| --- | --- |
| Teflon | 88 |
| Viton-A | 12 |

This sample was extruded into a 3/32-inch strand at 13,400 pounds per square inch pressure, and also into a ribbon 1.5 inches wide and 0.375 inch thick at 2,000 pounds per square inch.

The present invention may be used with pure polytetrafluoroethylene or with polytetrafluoroethylene containing a filler such as metal, carbon, inorganic salts, or the like. Tungsten and lead were two metal powder fillers which were used in this invention and found to extrude very well.

In carrying out the invention a preform or article such as a rod, internal star-perforated grain, tube, or wedge may be formed by cold pressing, by rolling, by extrusion or in any other known manner.

The processing of Teflon with a fairly small percentage of Viton-A, Kel-F elastomer or Fluorel, markedly reduces the temperature and/or pressure necessary to process and extrude products in a finished well consolidated form. For instance, a sample of pure tetrafluoroethylene alone was extruded into a 1.4-inch rod at between 700 and 800° F. and 18,000 pounds per square inch; in contrast, a sample of polytetrafluoroethylene with a small amount (about 12%) of a copolymer of vinylidene fluoride and perfluoropropylene was extruded into a 1.0-inch rod at a temperature ranging between 180° and 200° F., and at 2,000 pounds per square inch. The rod maintained uniform high strength throughout.

Obviously many modifications and variations of the present invention are possible in the light of the above teachings. It is therefore to be understood that within the scope of the appended claims the invention may be practiced otherwise than as specifically described.

What is claimed is:

1. A composition of matter comprising 12 to 35% by weight of a copolymer of vinylidene fluoride and perfluoropropylene in intimate admixture with 65 to 88% by weight of polytetrafluoroethylene, said copolymer consisting essentially of 32.1% by weight carbon, 1.8% by weight hydrogen and 66.1% by weight fluorine.

2. A process for making a polytetrafluoroethylene composition of improved extrudability which comprises forming a low-boiling ketone solution of a copolymer of vinylidene fluoride and perfluoropropylene, mixing into said solution polytetrafluoroethylene in an amount to provide a mixture containing about 65 to 88% by weight of polytetrafluoroethylene and correspondingly about 35 to 12% by weight of said copolymer based on the combined weight of polytetrafluoroethylene and copolymer present, separating said ketone from said mixture by washing said mixture with hexane, and recovering a dry polymeric composition composed of polytetrafluoroethylene and said copolymer; said copolymer consisting essentially of 32.1% by weight carbon, 1.8% by weight hydrogen and 66.1% by weight fluorine.

3. A process for making an improved polytetrafluoroethylene composition which is extrudable at temperatures ranging from 225° F. to 150° F. which comprises
 (a) dissolving the copolymer of vinylidene fluoride and perfluoropropylene in acetone to form a solution containing from 12 to 35% by weight of the copolymer; said copolymer consisting essentially of 32.1% by weight carbon; 1.8% by weight hydrogen and 66.1% by weight fluorine;
 (b) mixing into said solution from 65 to 88% by weight polytetrafluoroethylene to form a slurry;
 (c) washing said slurry with excess hexane whereby the acetone is removed;
 (d) decanting said hexane leaving a powdery residue composed of polytetrafluoroethylene and the copolymer; and
 (e) drying said residue at ambient temperature.

References Cited by the Examiner
UNITED STATES PATENTS

| | | | |
|---|---|---|---|
| 2,820,772 | 1/1958 | Barnhart | 260—900 |
| 3,019,206 | 1/1962 | Robb | 260—900 |
| 3,030,260 | 4/1962 | Metzler et al. | 260—900 |

MURRAY TILLMAN, *Primary Examiner.*

LEON J. BERCOVITZ, *Examiner.*

J. A. KOLASCH, J. WHITE, *Assistant Examiners.*